United States Patent [19]

Soloy

[11] 4,116,408

[45] Sep. 26, 1978

[54] PORTABLE HELIPORT

[75] Inventor: Joe I. Soloy, The Dalles, Oreg.

[73] Assignee: Soloy Conversions, Ltd., The Dalles, Oreg.

[21] Appl. No.: 759,354

[22] Filed: Jan. 14, 1977

Related U.S. Application Data

[63] Continuation of Ser. No. 673,669, Apr. 5, 1976, abandoned, which is a continuation of Ser. No. 518,599, Oct. 29, 1974, abandoned.

[51] Int. Cl.² .............................................. B64F 1/00
[52] U.S. Cl. .............................. 244/114 R; 244/110 E
[58] Field of Search .......... 244/114 R, 110 E, 137 R; 114/261; 52/646, 648; 24/19, 132 WL, 249 R, 250 R, 273; 182/63

[56] References Cited

U.S. PATENT DOCUMENTS

| 1,164,967 | 12/1915 | Thorp | 244/110 E X |
|---|---|---|---|
| 1,292,097 | 1/1919 | Schweinert | 114/261 |
| 1,825,074 | 9/1931 | Knapp | 24/132 WL |
| 2,304,343 | 12/1942 | Diesbach | 24/19 X |
| 2,575,461 | 11/1951 | North | 52/646 X |
| 3,147,940 | 9/1964 | Laufer | 244/114 R |
| 3,201,156 | 8/1965 | Coats | 24/273 X |
| 3,248,074 | 4/1966 | Cannon | 244/137 R |
| 3,456,909 | 7/1969 | Wainwright | 244/114 R |
| 3,489,380 | 1/1970 | Vanderlip | 244/114 R |

Primary Examiner—Barry L. Kelmachter
Attorney, Agent, or Firm—Klarquist, Sparkman, Campbell, Leigh, Hall & Whinston

[57] ABSTRACT

A portable heliport adapted to be transported by a helicopter is described. The heliport includes a pair of deck extensions having foldable, extensible legs and which are hinged to a central deck supported by extensible legs. The deck extensions are folded and allowed to unfold by a winch which is detachable from the central deck and whose winch support also supports the deck extensions for transport by the helicopter. The extensible legs have threaded tubes telescoping in fixed tubes and quick releasable internally threaded, split clamps attached to the fixed tubes hold the threaded tubes in adjusted positions. The threaded tubes may be screwed into or out of the split clamps for fine adjustments. The legs on one side of the deck are longer than those on the opposite side so that, when the legs are all in contracted conditions, the port is in a condition adapted to a moderate slope site.

6 Claims, 11 Drawing Figures

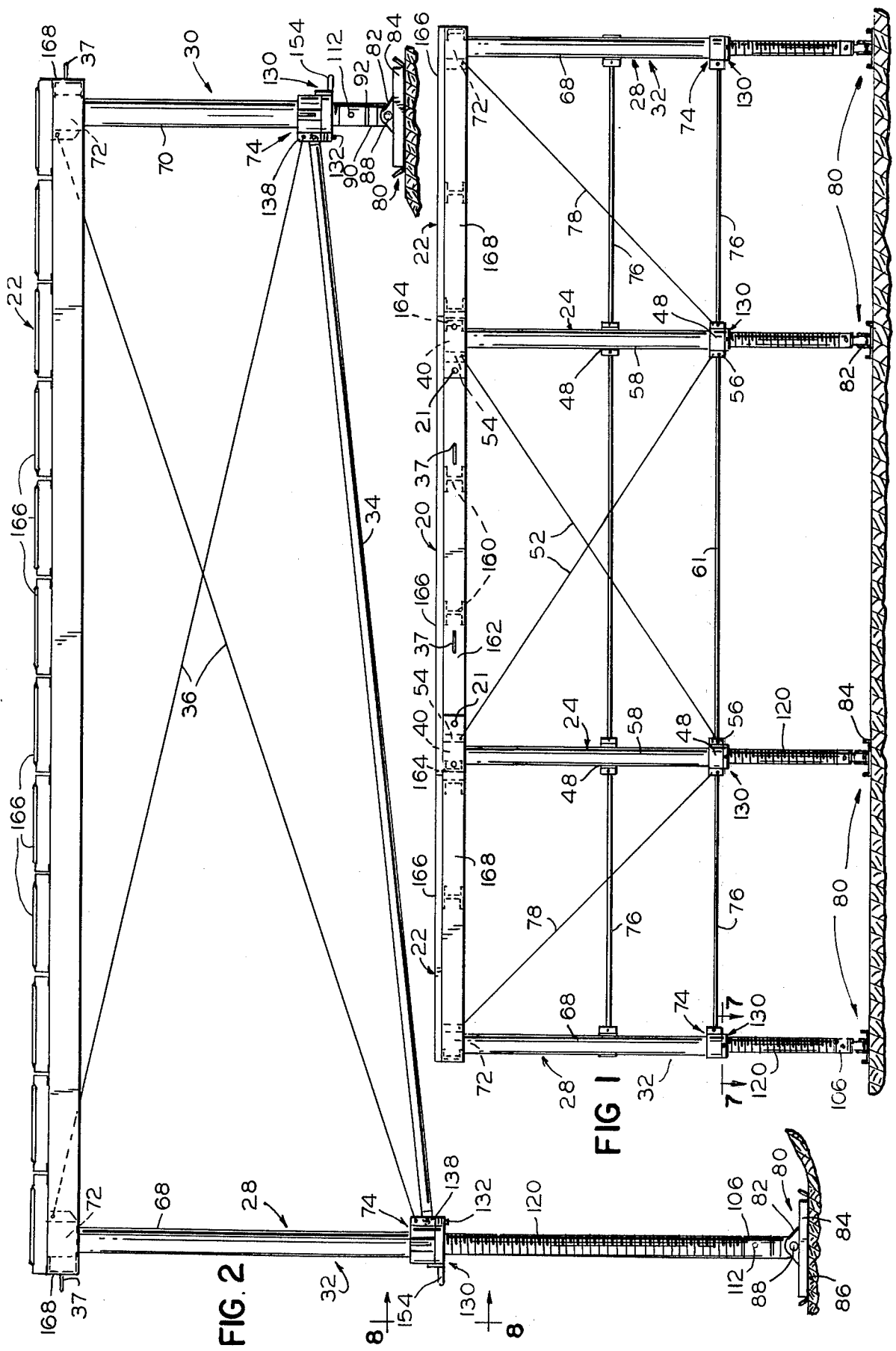

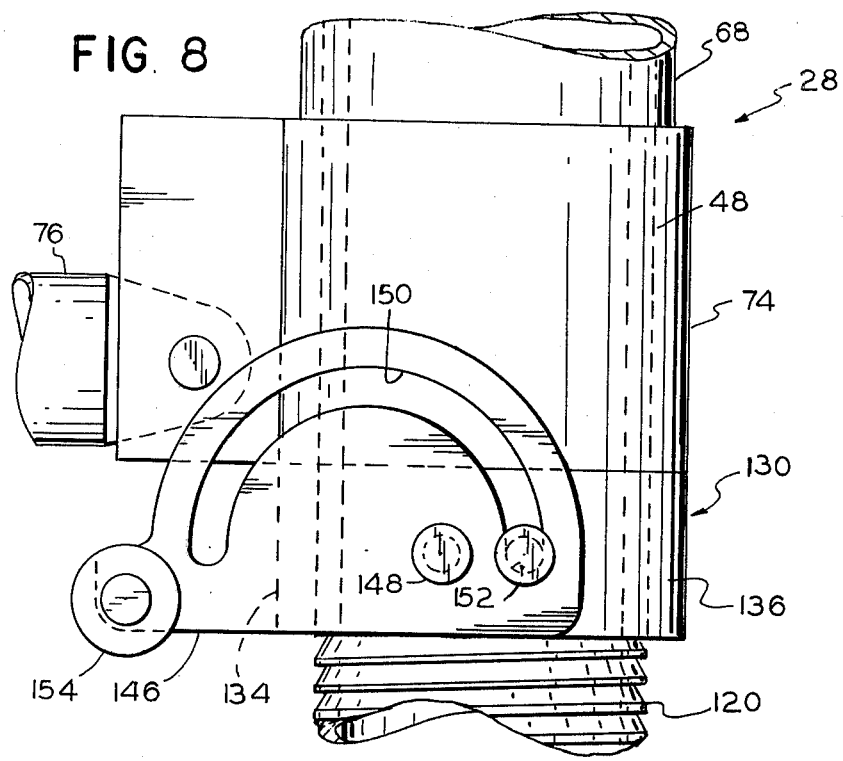
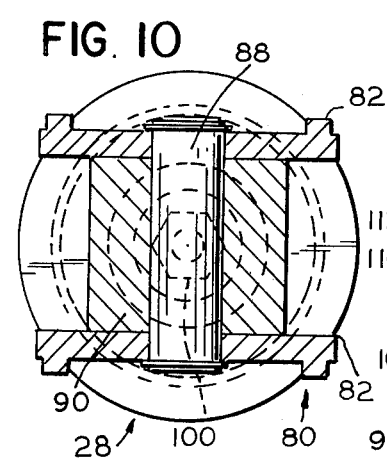
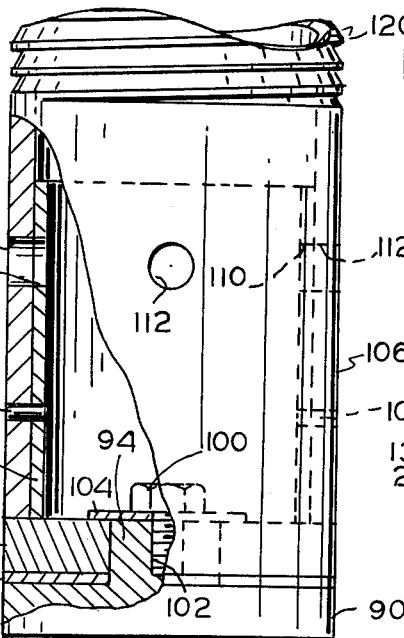
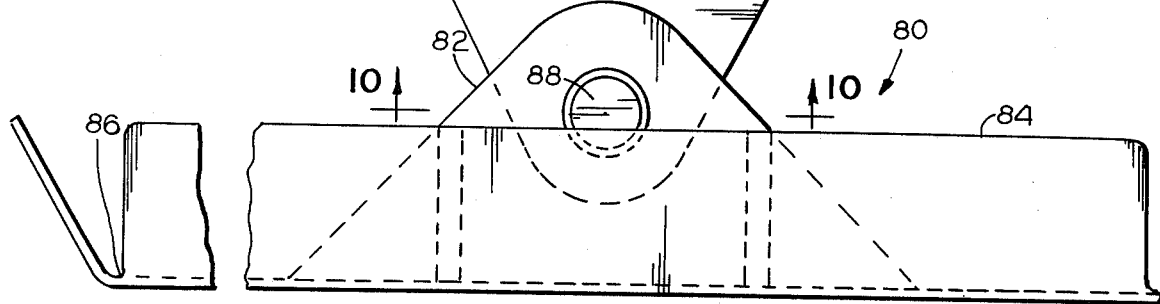

PORTABLE HELIPORT

This is a continuation of application Ser. No. 673,669 filed Apr. 5, 1976 which is a continuation of application Ser. No. 518,599 filed Oct. 29, 1974, both abandoned.

BACKGROUND OF INVENTION

This invention relates to an improved portable heliport and specifically to such a heliport having a folding deck which is adapted to be transported by a helicopter.

There have been portable heliports proposed in the past. Laufer U.S. Pat. No. 3,147,940 discloses a trailer-like heliport which is adapted to be pulled by a truck but is not adapted to be lifted and transported by a helicopter. Vanderlip U.S. Pat. No. 3,489,380 discloses a heliport which can be transported by a helicopter but requires relatively level ground and uses a net construction which involves complex cabling.

It is therefore one object of the present invention to provide an improved portable heliport of simple and economical construction which can be set up on unlevel ground.

Another object of the invention is to provide a heliport which can be folded or disassembled to an easily transported condition.

A further object of the invention is to provide a portable heliport which is adapted to be transported by a helicopter and is unfoldable by a helicopter passenger or crew.

Another object of the invention is to provide a portable heliport having extensible legs secured in adjusted positions by quick releasable split clamps.

Another object of the invention is to provide a heliport having telescopic legs including threaded, extensible tubes and internally threaded, split clamps which are quickly released for coarse adjustment of the threaded tubes and permitting the tubes to be screwed into and out of the clamps for fine adjustments.

In the drawings:

FIG. 1 is an end elevation view of a portable heliport forming one embodiment of the invention;

FIG. 2 is a side elevation view of the heliport of FIG. 1;

FIG. 8 is an enlarged, fragmentary, elevation view taken along line 8—8 of FIG. 7;

FIG. 9 is an enlarged, fragmentary, elevation view of the heliport of FIG. 1;

FIG. 10 is an enlarged, horizontal, sectional view taken along line 10—10 of FIG. 9; and, FIG. 11 is a fragmentary, perspective view of a portion of a portable heliport forming an alternate embodiment of the invention.

Figure 3:
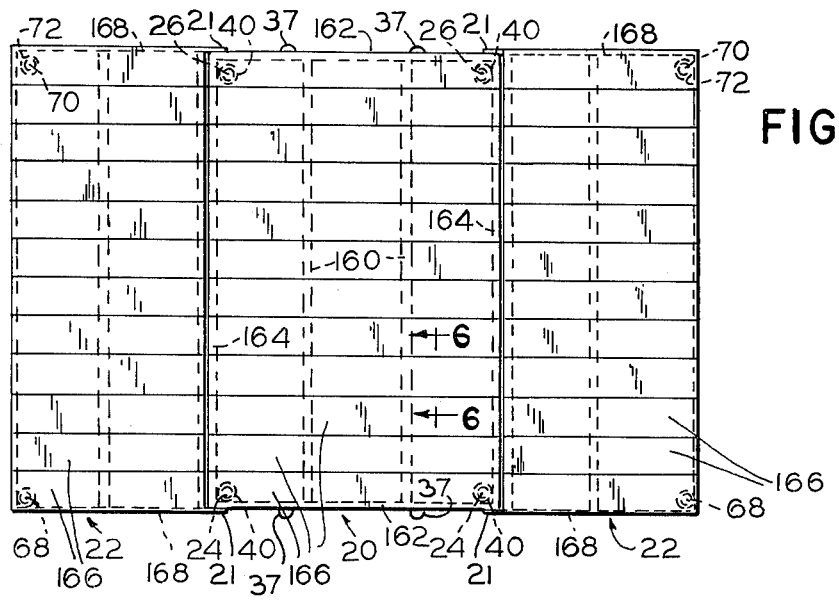
FIG. 3 is a top plan view of the heliport of FIG. 1.

Referring now in detail to the drawings, there is shown therein a portable heliport forming one specific embodiment of the invention and including a central deck 20 (FIGS. 1 and 3) which are connected by hinge connections 21 to deck extensions 22. The central deck 20 is supported by a pair of longer extensible legs 24 and a pair of shorter extensible legs 26 or any combination of leg lengths. Each of the deck extensions 22 is supported by the central deck at one edge and by a longer extensible leg 28 like the legs 24, and a shorter extensible leg 30 like the legs 26. The legs 28 and 30 of each deck extension is foldable relative thereto and forms a folding leg assembly 32 with bottom brace 34 (FIG. 5) and bracing cables 36. Eyes 37 are provided for hooking cables of a helicopter thereto to connect the helicopter to the heliport.

The legs 24 and 26 are rigidly secured to sockets 40 (FIG. 1) and each leg 24 is braced to one of the legs 26 by cables 42 (FIG. 5) attached to ears 44 on the sockets 40 and to ears 46 on lower sockets 48. Tubular lower braces 50 are attached to the ears 46 to brace the legs 24 and 26. The legs 24 are similarly braced together by cables 52 secured to ears 54 of the sockets 40 and to ears 56 of the lower sockets 48, and the legs 26 are similarly braced by cables 55 (FIG. 4) and a bottom brace 57. The legs 24 and 26 include tubes 58 and 60, respectively, rigidly secured to the sockets 40 and 48. A lower brace 61 is secured to the socket 48.

Figure 4:
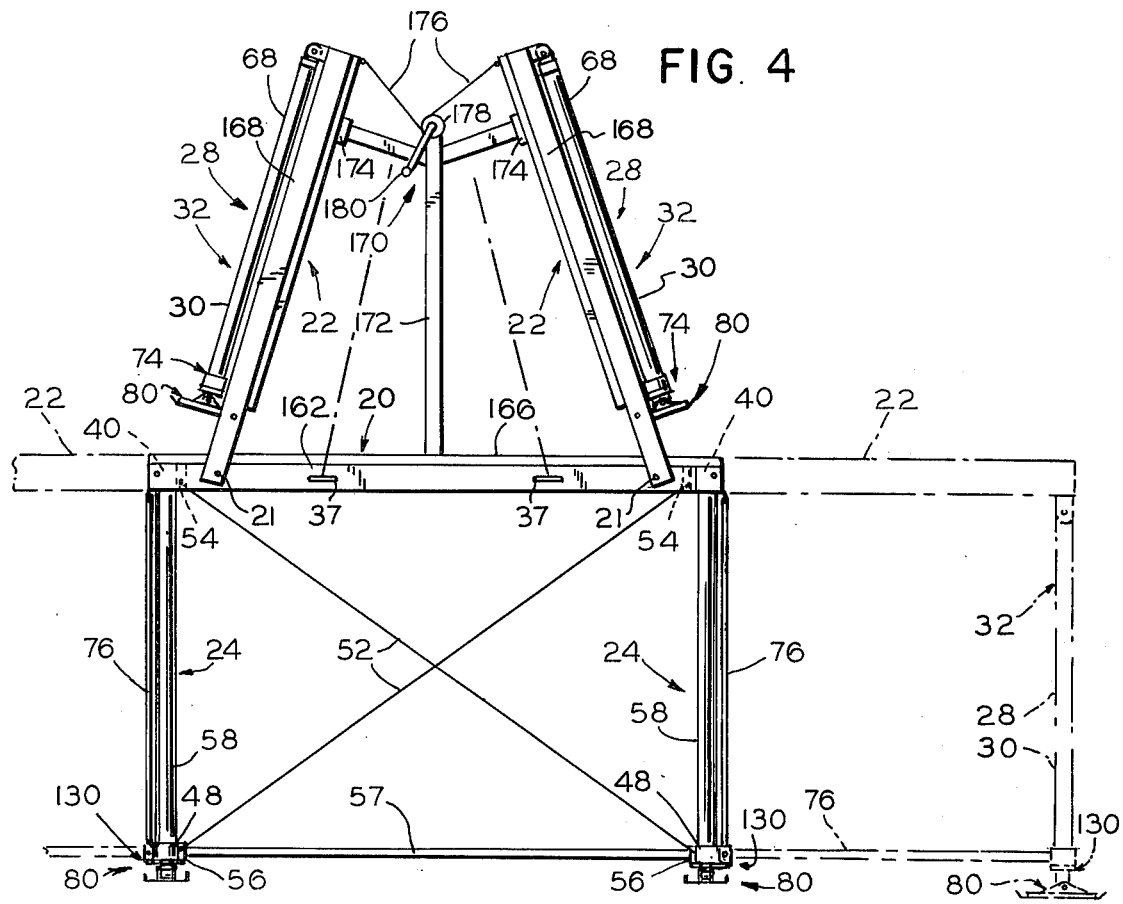
FIG. 4 is an end elevation view of the heliport of FIG. 1 with a deck thereof folded.

The legs 28 and 30 (FIG. 2) include tubes 68 and 70, respectively, like the tubes 58 and 60, and are rigidly secured to upper sockets 72 pivotally attached to the deck extensions 22. The tubes 68 and 70 have secured to the lower ends thereof sockets 74, to which the lower braces 34 are secured, and which are like the sockets 48. Braces 76 (FIGS. 1 and 4) are pivotally secured to the sockets 48, and are detachably pinned to the sockets 74 so that they can be folded up along the legs 24 and 26 when the heliport is in its contracted, portable condition, as shown in FIG. 4. Cables 78 are secured to the sockets 72 and are secured detachably to the sockets 48, the lower ends of the cables 78 being provided with hooks detachable from the sockets 48 when the extensions are to be folded.

Feet 80 (FIGS. 1, 2, 9 and 10) have ribbed clevises 82 secured to sides 84 and bottoms 86, and are pivoted by pins 88 to swivels 90 bearing against nylon washers 92. The swivels have vertical shaft portions 94 journaled in bearings 96 on sleeves 98. Capscrews 100 screwed into tapped bores 102 in the shaft portions bear against bronze washers 104 to hold the swivels on the bearings 96. The sleeves 98 fit in leg extension tubes 106 and are secured thereto by pins 108 with holes 110 in the sleeves aligned with holes 112 in the tubes 106. The holes 110 and 112 are for receiving a bar (not shown) for turning the tubes 106 for fine height adjustment. The legs 24, 26 and 30 are of substantially the same construction as that just described of the legs 28.

Figure 7:
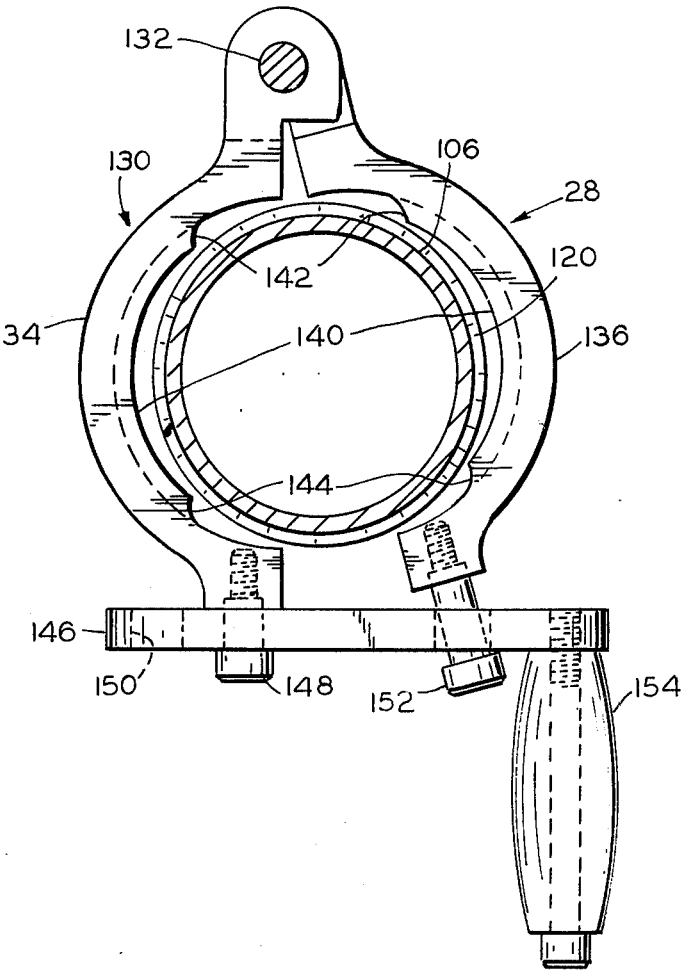
FIG. 7 is an enlarged, fragmentary, horizontal sectional view taken along line 7—7 of FIG. 1.

The leg extension tubes above the sleeves 98 are provided with buttress screw threads 120 and are telescopic relative to the tubes 68. The sockets 48 and 74 carry releasable, internally threaded, split clamps 130 (FIGS. 1, 7 and 8), bolts 132 pivotally securing arcuate arms 134 and 136 of the clamps together and being secured to ears of the sockets 48 and 74. The arms 134 and 136 have opposed buttress thread segments 140 adapted to threadedly engage the tubes 106. The arms also have unthreaded clearance portions 142 and 144. The threaded portions of the clamps and the leg extension tubes are treated with a baked on molybenum disulfide as a dry lubricant to prevent galling as aluminum to aluminum will do. An overcenter latching arm 146 of each clamp 130 is pivotally mounted on pin 148 secured to the arm 134 and has an overcenter cam slot 150. Pin 152 secured to the arm 136 extend through the cam slot 150. The arm 146 of each clamp 130 may be swung from a clamping position shown in FIG. 8 wherein the thread segments 140 fit into the threads 120 to a releasing position shown in FIG. 7 in which the thread segments 140 are completely withdrawn from the threads 120. Handles 154 are mounted on the arms 146 for manually moving them to open and close the clamps. When each clamp is open, the extension tube 106 may be moved further into or out of the tubes 58, 60, 68 or 70 with which it is associated to get the desired height of that leg, and then the clamp is reclosed to securely hold the leg in its adjusted position. For a height adjustment of a small amount, the clamp can be kept closed and the tube 106 turned part of a turn in the clamp, a bar (not shown) being inserted into the holes 110 and 112 for this turning.

Figure 6:
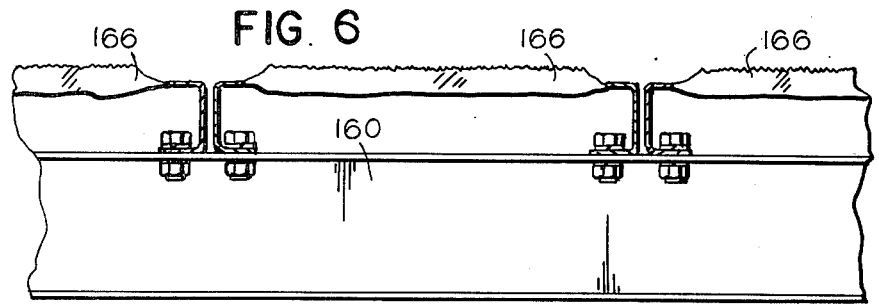
FIG. 6 is an enlarged, fragmentary, vertical view taken along line 6—6 of FIG. 3.

The central deck 20 includes I-beams 160 (FIGS. 1, 3 and 6) secured to channels 162 secured to channels 164 to complete the framework. Expanded metal planks 166 are bolted to the I-beams and the channels 164. The deck extensions 22 are similarly constructed but have channels 168 overlapping the channels 162 and being pivotally connected thereto between the expanded, operative condition shown in FIG. 1 to the folded or contracted, portable condition shown in FIG. 4.

A winch support 170 (FIG. 4) has a central upright 172 detachably secured to the central deck 20 and also has pads 174 engaging and supporting the deck extensions 22, cables 176 pulling the extensions against the pads. A winch 178 manually tightens or loosens the cables 176 which have hooks releasably engaging the extensions. A handle 180 drives the winch.

Figure 5:
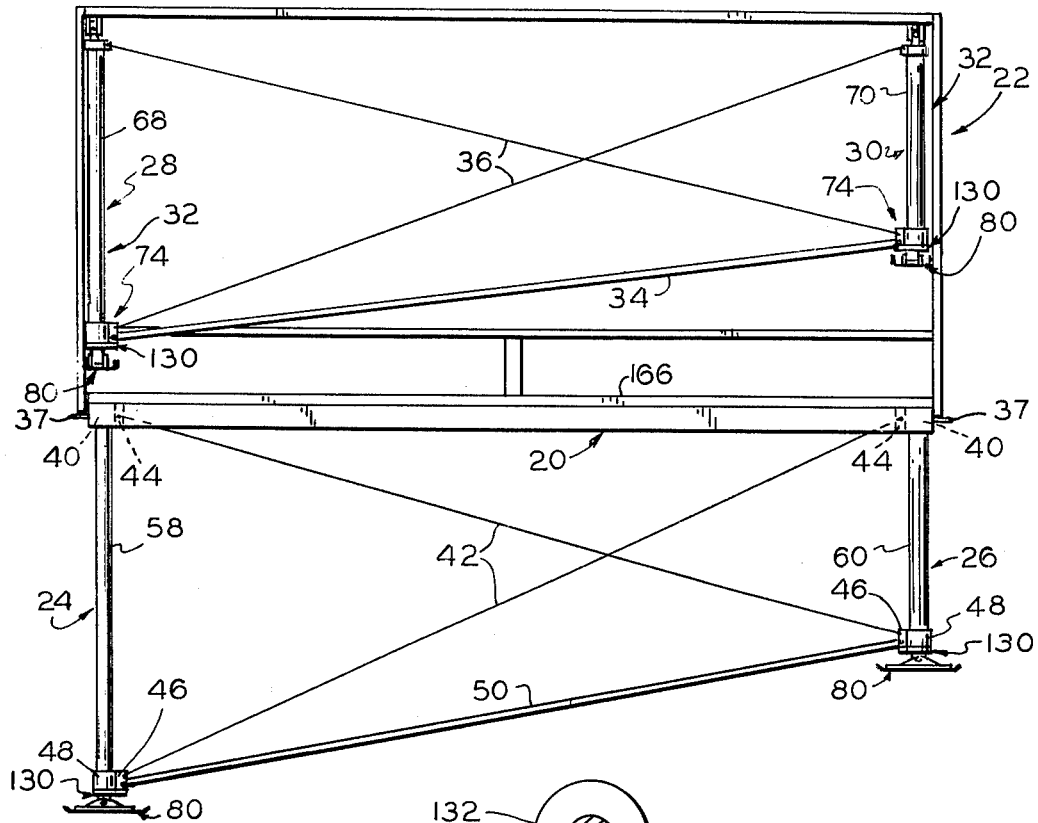
FIG. 5 is a side elevation view of the heliport of FIG. 1 with the deck thereof folded.

As best shown in FIGS. 2 and 5, the shorter legs 26 and 30 are all located at one side of the deck and the longer legs 24 and 28 are all at the opposite side. This, with the leg contracted, initially sets up the heliport in a condition adapted to an intermediate slope. However, if the site ground is level, the legs 26 and 30 are merely extended to the same length as the unextended legs 24 and 28. For steep slopes the legs 26 and 30 are contracted and the legs 24 and 28 extended to the extent necessary to make the deck level. The leg assemblies 32 are adapted to fold in against the deck extensions 22 when the deck extensions are being folded back on the central deck, and the leg assemblies 32 fold out from the deck extensions as the deck extensions are lowered to their operative positions.

In FIG. 11 there is shown a split clamp 230 to be used in place of one of the split clamps 130. The split clamp 230 is like the clamps 130, but instead of the latching arm 146, the split clamp 130 includes an overcenter, toggle type latch 250 having an angled link 252 pivotally connected to arcuate arm 134 and to an intermediate portion of an actuating lever 254 pivotally connected to arcuate arm 136. The link 252, when in its overcenter, locking position, engages pin 256, which pivotally connects the lever to the arm 136. Holes 258 are provided in the lever and the link to removably receive a safety latching pin (not shown).

What is claimed is:

1. In a portable heliport,
   a central deck,
   winch means including a central support and a pair of pads,
   means detachably securing said central support of the winch means to the central deck,
   deck extension means foldable into engagement with the pads,
   means mounting the deck extension means foldably on the central deck,
   and cable means connecting the winch means to the deck extension means.

2. The portable heliport of claim 1 wherein the winch means includes handle means positioned above the central deck in a position operable by a helicopter pilot to lower the deck extension means.

3. In a portable heliport,
   a central deck,
   a plurality of deck extensions,
   hinge means connecting the deck extensions to the central deck,
   means for supporting the heliport by a helicopter for transport,
   folding leg means connected to the deck extensions,
   and second leg means connected to the central deck,
   some of the leg means being telescopic,
   the telescopic leg means including fixed tubes, extensible tubes telescopic relative to the fixed tubes, and releasable split clamp means for holding the extensible tubes in adjusted positions relative to the fixed tubes,
   the extensible tubes having threaded portions and being rotatable,
   the split clamp means having thread segments for engaging the threaded portions.

4. In a portable heliport
   deck means,
   and leg means for supporting the deck means and including at least one extensible leg,
   said extensible leg including a fixed leg section secured to the deck means, an extensible leg section telescopic relative to the fixed leg section, and quickly releasable locking means comprising a split clamp for holding the extensible leg section in a plurality of extended positions relative to the fixed leg section,
   the split clamp including a pair of arms, a pair of opposed thread segments on the arms, and quick release actuating means for opening and closing the arms relative to the extensible leg section,
   the extensible leg section having an external thread adapted to interlock with the thread segments when the arms are closed.

5. The portable heliport of claim 4 wherein the extensible leg section is rotatable relative to the clamp to screw the extensible leg section further into and farther out of the clamp.

6. The portable heliport of claim 4 wherein the quick release actuating means includes a pin secured to one arm and a movable slotted member on the other arm.

* * * * *

UNITED STATES PATENT OFFICE
CERTIFICATE OF CORRECTION

Patent No. 4,116,408          Dated September 26, 1978

Inventor(s) Joe I. Soloy

It is certified that error appears in the above-identified patent and that said Letters Patent are hereby corrected as shown below:

Col. 2, line 51, after "tubes" insert --106--

Col. 2, line 63, change "molybenum" to --molybdenum--

Col. 2, line 67, change "extend" to --extends--

Col. 3, line 35, change "leg" to --legs--

*Signed and Sealed this*

*Second* Day of *January 1979*

[SEAL]

*Attest:*

RUTH C. MASON
*Attesting Officer*

DONALD W. BANNER
*Commissioner of Patents and Trademarks*